(12) United States Patent
Amritphale et al.

(10) Patent No.: US 9,890,081 B2
(45) Date of Patent: Feb. 13, 2018

(54) FUNCTIONALIZED BRINE SLUDGE MATERIAL AND A PROCESS FOR THE PREPARATION THEREOF

(71) Applicant: Council of Scientific & Industrial Research, New Dehli (IN)

(72) Inventors: Sudhir Sitaram Amritphale, Bhopal (IN); Sarika Verma, Bhopal (IN); Satyabrata Das, Bhopal (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 15/245,521

(22) Filed: Aug. 24, 2016

(65) Prior Publication Data
US 2017/0057868 A1 Mar. 2, 2017

(30) Foreign Application Priority Data
Sep. 2, 2015 (IN) .......................... 2751/DEL/2015

(51) Int. Cl.
| | |
|---|---|
| *C04B 18/04* | (2006.01) |
| *C04B 28/00* | (2006.01) |
| *C04B 28/02* | (2006.01) |
| *G21F 1/04* | (2006.01) |

(52) U.S. Cl.
CPC ........ *C04B 18/0418* (2013.01); *C04B 28/006* (2013.01); *C04B 28/021* (2013.01); *G21F 1/045* (2013.01); *Y02P 40/165* (2015.11); *Y02W 30/91* (2015.05); *Y02W 30/92* (2015.05)

(58) Field of Classification Search
None
See application file for complete search history.

(56) References Cited

U.S. PATENT DOCUMENTS

| | | | | |
|---|---|---|---|---|
| 3,962,076 A | * | 6/1976 | Hess ................... | B01D 11/0426 201/25 |
| 4,381,288 A | * | 4/1983 | Weiss ..................... | C01G 13/00 210/901 |
| 4,710,367 A | * | 12/1987 | Wong ........................ | C02F 9/00 423/109 |
| 4,761,182 A | * | 8/1988 | Whitescarver ...... | C04B 18/0418 106/709 |
| 5,366,891 A | * | 11/1994 | Premuzic .............. | B09B 3/0016 423/1 |
| 2006/0175236 A1 | * | 8/2006 | Sower ...................... | B01D 1/24 210/175 |
| 2013/0048562 A1 | * | 2/2013 | Keister .................... | C01D 3/06 210/638 |
| 2017/0257987 A1 | * | 9/2017 | Amritphale .......... | H05K 9/0073 |

FOREIGN PATENT DOCUMENTS

| | | |
|---|---|---|
| CN | 101823822 | 9/2010 |
| CN | I01823738 | 9/2010 |

OTHER PUBLICATIONS

Gam & Pundir, *Utilization of Brine Sludge in Nonstructural Building Components: A Sustainable Approach*, Hindawi Publishing Corporation, Journal of Waste Management, vol. 2014, Article ID 389316, 7 pages.

* cited by examiner

*Primary Examiner* — Joseph D Anthony
(74) *Attorney, Agent, or Firm* — Alston & Bird LLP

(57) ABSTRACT

Brine sludge is an industrial waste generated in chloral alkali industry. The generated brine sludge waste is dumped into landfills and contains barium sulphate, calcium carbonate, magnesium hydroxide, sodium chloride, clay, and toxic elements like chromium, zinc, copper, and vanadium, therefore posing an environmental threat. Consequently, there is an urgent need to convert toxic brine sludge waste into its non-toxic form. The present invention thus aims to achieve total utilization of this brine sludge for making functionalized brine sludge material useful for a broad application spectrum.

7 Claims, No Drawings

FUNCTIONALIZED BRINE SLUDGE MATERIAL AND A PROCESS FOR THE PREPARATION THEREOF

CROSS-REFERENCE TO RELATED APPLICATIONS

This application claims the benefit of and priority to Indian Patent Application No. 2751/DEL/2015, filed on Sep. 2, 2015, the entire content of which is incorporated herein by reference in its entirety for all purposes.

TECHNICAL FIELD

The present invention relates to functionalized brine sludge material useful for multifarious applications. The invention further relates to a process for the preparation of the said brine sludge functionalized material, which involves in-situ synthesis of multi elemental, micron to nano-sized, non-toxic, functional materials, utilizing unique characteristics of chemical compounds inherently present in the brine sludge. The developed materials find application in areas such as radiation shielding materials, geopolymeric materials and chemically designed composites.

BACKGROUND

The development of nano and non-toxic materials have attracted great attention of material scientists due to their fascinating characteristics, enabling synthesis of multifunctional materials and addressing the challenges of solving problem of utilization of toxic and non-toxic industrial wastes for making value added materials useful for broad application spectrum.

Brine sludge is an industrial waste generated in the chloralkali industry. The chloralkali process is the main process for manufacturing of caustic soda and chlorine production all over the world. In India a total of almost 36 chloralkali plants are in operational form. Brine mud generation is around 30 kg per ton caustic soda in India, which is more than double the international average. To achieve total utilization of this brine sludge, no processes have been developed to date.

In the chloralkali industry, the production of NaOH and chlorine is carried out by the electrolysis of purified brine solution, i.e. 30% sodium chloride solution, and the process of purification of impure brine solution involves removal of sulphate and chloride salts of magnesium and potassium. Removal of sulphate species is carried out by adding barium carbonate, which is expensive and leads to the generation of toxic brine sludge waste containing barium sulphate. Further removal of chloride species is carried out by adding sodium carbonate leading to the generation of brine sludge containing calcium carbonate and magnesium hydroxide. The generated brine sludge waste is dumped into landfills, which contains barium sulphate, calcium carbonate, magnesium hydroxide, sodium chloride, clay and toxic elements like chromium, zinc, copper and vanadium, therefore posing environmental threat. Therefore, there is an urgent need to provide a process which converts toxic brine sludge waste into non-toxic form.

Reference may be made to the article Utilization of Brine Sludge in Nonstructural Building components: A Sustainable Approach, by Mridul Garg and Aakanksha Pundir in Journal of Waste Management, vol.2014, Article ID 389316, 7 pages, wherein brine sludge has been utilized for making low value items like bricks and paver blocks using conventional cement and fly ash. However, the drawbacks of the cited process are that the brine sludge has been used in conjunction with cement and fly ash for making only paver blocks and bricks with only 35%, i.e. minimal utilization, of brine sludge. Thus, the problem of utilization of 65% brine sludge still remains. Further, the toxic elements present in the brine sludge have only been stabilized in cement matrix without forming any chemical linkages with the toxic elements. Hence, there is no assurance of non-leaching of the toxic elements in the environment from the prepared bricks and paver blocks. Since the brine sludge has not been converted into nano size and in functionalized form, it poses limited application in making paver blocks and brick materials only. Additionally, the developed process is based on the age old concept of stabilization of industrial waste into low value added materials to somehow address the problem of disposal and utilization of waste. The process does not teach the use of any advance synthesis technology for making value added materials so as to meet the challenges and stringent rules and regulations of environmental protection acts to address the problem of utilization of industrial toxic wastes.

Reference may be made to the patent publication No. CN101823738A, wherein a method for co-production of fine calcium carbonate and sodium silicate during preparation of light magnesium carbonate by chloralkali brine sludge has been reported. However, the drawbacks of the process are that it involves multiple steps, is energy intensive, and does not utilize the brine sludge in totality, thereby posing threat to the environment.

Reference may be made to the patent publication No. CN101823822A, wherein hydrochloric acid is used for purifying precipitates of calcium carbonate and calcium sulphate left after the production of light magnesium carbonate. However, the drawbacks of the process reside in the fact that it involves multiple steps, is energy and equipment intensive, and does not utilize the brine sludge in totality, thereby posing threat to the environment.

Further, from the reported prior art it is evident that total utilization of brine sludge for making highly value added advance materials has not been pursued seriously. From the hitherto reported prior art and based on the drawbacks of the known processes, the various issues that need to be addressed and problems to be solved for utilization of toxic brine sludge are summarized here as follows:

- The brine sludge is toxic and therefore, it creates threat to the environment by remaining unutilized.
- Since the brine sludge contains very useful and expensive chemical compounds such as barium sulphate, magnesium hydroxide and calcium carbonate, it can find application in making highly value added and functionalized materials such as radiation shielding materials, geo polymeric materials, and advanced chemically designed composite (ACDC) materials by utilizing unique characteristics of chemical compounds inherently present therein.
- Brine sludge waste is available in micron size particles, thus restricting its functionality and thereby leading to limited applications thereof in making low value items such as paver blocks and brick materials only.

The main object of the present invention is therefore to provide functionalized brine sludge composites useful for multifarious applications.

Another object of the present invention is to provide a process for the preparation of functionalized brine sludge composites by simultaneous in-situ synthesis of materials inherently present in brine sludge.

Yet another object of the present invention is to provide a process which converts micron sized brine sludge to nano sized brine sludge based materials.

Still another object of the present invention is to provide a process for the preparation of non-toxic functionalized brine sludge based composite materials which have increased homogeneity among the various constituents present therein.

Yet another object of the present invention is to provide a process which utilizes irradiation capability of microwave so as to enable simultaneous and synergistic chemical reactions among the various ions of the reactants, namely brine sludge, fly ash, sodium hydroxide, ethylene glycol, cetyl trimethyl ammonium bromide, and water leading to multi-functional ability of the developed materials.

Still another object of the present invention is to provide a process which ensures total utilization of toxic brine sludge thereby solving the problem associated with disposal thereof.

Yet another object of the present invention is to provide a process which exhibits marked reduction in steps, duration and temperature of synthesis thereby leading to increased productivity.

SUMMARY

The present invention provides a functionalized brine sludge material and a novel process for making such functionalized brine sludge material useful for a broad application spectrum. The novel process enables simultaneous in-situ synthesis of multi elemental nano-sized, non-toxic, and functionalized brine sludge material, conversion of toxic brine sludge into non-toxic form by forming chemical linkages of toxic elements with silicon and aluminum in fly ash based geopolymeric matrix, conversion of chemical compounds present in brine sludge from micron to nanosize, and increased chemical homogeneity among the various constituents present in the brine sludge imparting functionality to the developed materials.

Further, in said process, instead of conventional heating alone, the synchronizing irradiation capability of microwaves can also be utilized so as to enable simultaneous and synergistic chemical reactions among the various ions of the reactants, namely brine sludge, fly ash, sodium hydroxide, ethylene glycol, cetyl trimethyl ammonium bromide, and water, which leads to the development of novel materials useful for miscellaneous applications. The developed functionalized brine sludge material has a broad application spectrum (e.g., for making a) radiation shielding materials, b) geopolymeric materials, and c) chemically designed composite materials).

The process consist of only two steps, namely 1) Refluxing 2) Filtration and drying.

Refluxing—a) Mixture of 10 g-50 g of brine sludge, 50 g-100 g of fly ash, 6 g-13 g of sodium hydroxide, 250 ml-500 ml of ethylene glycol, 1 g-10 g of Cetyl trimethyl ammonium bromide and 12 ml-26 ml of water is refluxed in a round bottom flask in the temperature range of 190 to 250 degree C. for the period of 2-6 hours, OR b) the above mixture is refluxed using microwave synthesizer in the temperature range of 40-45 degree C. for a duration of 15-20 minutes.

Filtration and Drying—The above solution was filtered and further dried in an air oven at temperature of 100 degree C.-110 degree C. for a period of 1-2 hours resulting in the simultaneous in-situ synthesis of multi elemental, nano-sized, non-toxic, functionalized brine sludge material.

In an embodiment, the present invention provides a process which encompasses the following:

Simultaneous in-situ synthesis of materials utilizing brine sludge.

Making of nano-sized brine sludge materials from micron size.

Creation of non-toxic functionalized brine sludge materials.

To have increased homogeneity among the various constituents present in the developed multi-elemental, nano-sized, non-toxic, and functionalized brine sludge material, which is useful for imparting desired functionality thereto.

Apart from the conventional heating, the heating done using microwave enables simultaneous and synergistic chemical reactions among the various ions of the reactants, namely brine sludge, fly ash, sodium hydroxide, ethylene glycol, cetyl trimethyl ammonium bromide, and water, leading to the development of desired characteristics in the material.

Reduction in the duration of synthesis of materials from hours to 15-20 minutes, thereby achieving increased productivity.

Solving the problem associated with the disposal of toxic brine sludge waste so as to address the concern of choralkali industry all over the world.

To ensure complete utilization of toxic brine sludge in making highly value added and advanced functional materials.

To save upon the cost of costly chemicals required for the synthesis of claimed functionalized brine sludge materials, as the process involves the use of chemical entities inherently present in the brine sludge.

The prepared functionalized materials have applications in the areas like, e.g., a) radiation shielding materials, b) geopolymeric materials, and c) chemically designed composite (ACDC) materials.

The process involves only two steps for the synthesis.

In the present process, the synthesis is carried out at relatively low temperature of 40 to 45 degrees C. using microwave synthesizer as compared to a temperature of 190 to 250 degrees C. using conventional heating.

In another embodiment of the present invention, the process comprises together refluxing of homogenized mixture of brine sludge, fly ash, sodium hydroxide, ethylene glycol, cetyl trimethyl ammonium bromide, and water in a round bottom flask.

In still another embodiment, the present invention provides a process wherein the solution so obtained after mixing the brine sludge with other ingredients is either heated at a temperature ranging from 190 to 250 degrees C. for a period of 2 to 6 hours or using microwave synthesizer at a temperature ranging from 40 to 45 degrees C. for a period of 15 to 20 minutes.

In yet another embodiment, the present invention provides a process wherein the material so obtained is filtered.

In still another embodiment, the present invention provides a process wherein the material obtained after filtration is dried in an air oven at a temperature of 100 to 110 degrees C. for a period of 1 to 2 hours, resulting in the simultaneous in-situ synthesis of multi elemental, nano-sized, non-toxic, functionalized brine sludge material.

In yet another embodiment, the present invention provides a process wherein the synthesized functionalized brine sludge composite material is useful for making radiation shielding materials, geopolymeric materials, and chemically designed composite materials ensuring total utilization of brine sludge.

In still another embodiment, the present invention provides a process which enables a) conversion of toxic brine sludge into non-toxic form by forming chemical linkages of toxic elements with silicon and aluminum present in fly ash-based geopolymeric matrix, b) conversion of chemical compounds present in brine sludge from micron to nano size, and c) increased chemical homogeneity among the various constituents present in brine sludge waste and other reactants.

In yet another embodiment, the present invention provides a process wherein the simultaneous and synergistic chemical reactions among the various ions of the reactants, namely brine sludge, fly ash, sodium hydroxide, ethylene glycol, cetyl trimethyl ammonium bromide, and water leads to the designing of molecular moieties resulting in multi-functional ability of the developed materials for broad application spectrum.

In still another embodiment, the present invention provides a process which obviates the cost of costly chemicals such as barium sulphate, magnesium hydroxide, and calcium carbonate required to be added externally for the synthesis as the chemicals inherently present in brine sludge are utilized.

In yet another embodiment, the present invention provides a process wherein cetyl trimetyl ammonium bromide (CTAB) acts as an effective capping agent necessary for the conversion of materials to nano-size.

In still another embodiment, the present invention provides a process which involves only two steps for the synthesis of functionalized brine sludge composite material.

In yet another embodiment, the present invention provides a process wherein the synthesis temperature is reduced from 190 to 250 degrees C. to 40 to 45 degrees C. because of the use of microwave synthesizer.

DETAILED DESCRIPTION

The brine sludge contains a number of chemical compounds, namely barium sulphate, calcium carbonate, magnesium hydroxide, sodium chloride, toxic elements like chromium, zinc, copper, and vanadium, and clay-like materials. The presence of all these materials makes the matrix of brine sludge most non-uniform, non-homogeneous, and in segregated form. Therefore, a novel process has been developed to provide uniform, homogeneous brine sludge in non-segregated form.

Homogenization of the materials is done automatically during the reaction due to simultaneous and synergistic chemical reactions among the various ions of the reactants namely brine sludge, fly ash, sodium hydroxide, ethylene glycol, cetyl trimethylammonium bromide, and water.

Conversion of brine sludge from micron size to nano-size is done on its own during synthesis due to the presence of cetyl trimethyl ammonium bromide (CTAB), which acts as a powerful capping agent by converting the size of particles into nano range and also acting as a stabilizing agent.

The present invention thus provides functionalized brine sludge material prepared from brine sludge waste having multiple elements which are toxic and micron sized. The in-situ synthesis process of the present invention enables the conversion of the brine sludge waste into multi-elemental, nano-sized, non-toxic, and functionalized brine sludge material after adding a few ingredients such as fly ash, CTAB, ethylene glycol, and NaOH. The developed functionalized material is useful for multifarious applications.

Accordingly, the present invention provides functionalized brine sludge composite material comprising 10 g-50 g of brine sludge, 50 g-100 g of fly ash, 6 g-13 g of sodium hydroxide, 250 ml-500 ml of ethylene glycol, 1 g-10 g of cetyl trimethyl ammonium bromide, and 12 ml-26 ml of water.

The physico-chemical characteristics of the developed functionalized materials are as follows. Field Emission Scanning Electron Microscope (FESEM) imaging of the material shows the size of particles up to 15 nm, which confirms the development of nano-sized functionalized brine sludge material so synthesized. Energy-Dispersive X-Ray Spectroscopy (EDXA) shows the presence of elements like Ba, C, O, Na, Mg, Al, Si, S, Cl, and Ca, which confirms the development of multi-elemental functionalized brine sludge material so synthesized. Fourier Transform Infrared Spectroscopy (FTIR) shows the presence of varying functional group like sulphate, carbonate, hydroxide, etc. in the synthesized functionalized brine sludge. X-Ray Power Diffraction (XRD) confirms the crystalline nature and presence of different phases like barium sulphate, sodium chloride, magnesium hydroxide, silica, calcium carbonate, etc. in the synthesized functionalized brine sludge material.

The process for the preparation of the aforesaid functionalized material comprises together refluxing of a homogenized mixture of 10-50 g of brine sludge, 50 g-100 g of fly ash, 6 g-13 g of sodium hydroxide, 250 ml-500 ml of ethylene glycol, 1 g-10 g of Cetyl trimethyl ammonium bromide, and 12 ml-26 ml of water in a round bottom flask at a temperature ranging from 190 to 250 degrees C. for a period of 2 to 6 hours or using a microwave synthesizer at a temperature ranging from 40 to 45 degrees C. for a period of 15 to 20 minutes, thereby enabling simultaneous and synergistic chemical reactions among the various constituents of the brine sludge, fly ash, sodium hydroxide, ethylene glycol, cetyl trimethyl ammonium bromide, and water. The material thus obtained was filtered and dried in an air oven at a temperature of 100 to 110 degrees C. for a period of 1 to 2 hours resulting in multi-elemental, nano-sized, non-toxic, functionalized brine sludge material.

The developed process involves total utilization of toxic brine sludge possessing required complementary constituents for making desired composite materials. It is an energy efficient process requiring low temperature for the synthesis of materials. The use of microwave heating instead of conventional heating in the present process leads to reduction in the synthesis temperature as well as time. The process obviates the need of costly chemicals as it utilizes the chemicals inherently present in brine sludge, thereby making it cost effective and economic. The invented process involves only two steps for the synthesis of functionalized brine sludge composite material.

The developed functionalized brine sludge material has a broad application spectrum, e.g., for making a) radiation shielding materials, b) geopolymeric materials, and c) chemically designed composite materials.

EXAMPLES

The following examples are given by way of illustration of the working of the invention in actual practice and therefore should not be construed to limit the scope of the present invention in any manner.

Example 1

For making multi-elemental, nano-sized, non-toxic, and functionalized brine sludge material, refluxing of a homogenized mixture of 10 g of brine sludge, 50 g of fly ash, 6 g of sodium hydroxide, 250 ml of ethylene glycol, 1 g of cetyl trimethylammonium bromide, and 12 ml of water was done in a round bottom flask that was heated at temperature of 190 degrees C. for a period of 2 hours, and the material so obtained was further filtered and dried in an air oven at 110 degrees C. for a period of 1 hour so as to obtain the desired functionalized brine sludge material.

Example 2

For making multi-elemental, nano-sized, non-toxic, and functionalized brine sludge composite material, refluxing of a homogenized mixture of 20 g of brine sludge, 70 g of fly ash, 10 g of sodium hydroxide, 400 ml of ethylene glycol, 5 g of cetyl trimethyl ammonium bromide, and 20 ml of water was done in a round bottom flask and heated at a temperature of 200 degrees C. for a period of 2 hours, and the material so obtained was filtered and dried in an air oven at 110 degrees C. for a period of 1 hour so as to obtain the desired functionalized brine sludge material.

Example 3

For making multi-elemental, nano-sized, non-toxic, and functionalized brine sludge composite material, refluxing of a homogenized mixture of 40 g of brine sludge, 100 g of fly ash, 13 g of sodium hydroxide, 500 ml of ethylene glycol, 10 g of Cetyl trimethyl ammonium bromide, and 26 ml of water was done in a round bottom flask and heated at a temperature of 210 degrees C. for the period of 6 hours. The material so obtained was filtered and dried in an air oven at 110 degrees C. for a period of 1 hour so as to obtain the desired functionalized brine sludge material.

Example 4

For making multi-elemental, nano-sized, non-toxic, and functionalized brine sludge composite material, refluxing of a homogenized mixture of 30 g of brine sludge, 90 g of fly ash, 10 g of sodium hydroxide, 300 ml of ethylene glycol, 3 g of cetyl trimethyl ammonium bromide, and 20 ml of water was done in a round bottom flask and heated at a temperature of 200 degrees C. for a period of 2 hours. The material so obtained was filtered and dried in an air oven at 110 degrees C. for a period of 1 hour so as to obtain the desired functionalized brine sludge material.

Example 5

For making multi-elemental, nano-sized, non-toxic, and functionalized brine sludge composite material, refluxing of a homogenized mixture of 50 g of brine sludge, 50 g of fly ash, 6 g of sodium hydroxide, 250 ml of ethylene glycol, 1 g of Cetyl trimethyl ammonium bromide, and 12 ml of water was done in a round bottom flask at temperature of 220 degrees C. for a period of 2 hours, and the material so obtained was filtered and dried in an air oven at 110 degrees C. for a period of 1 hour so as to obtain the desired functionalized brine sludge material.

Example 6

For making multi-elemental, nano-sized, non-toxic, and functionalized brine sludge composite material, refluxing of a homogenized mixture of 45 g of brine sludge, 45 g of fly ash, 6 g of sodium hydroxide, 300 ml of ethylene glycol, 10 g of cetyl trimethyl ammonium bromide, and 12 ml of water was done in a round bottom flask using a microwave synthesizer at a temperature of 45 degrees C. for a duration of 15 minutes. The material so obtained was filtered and dried in an air oven at 110 degrees C. for a period of 1 hour so as to obtain the desired functionalized brine sludge material.

Table 1 below recites the properties/characteristics of the composite material obtained in Examples 1 to 6 and demonstrates the effect of various concentrations of raw materials and process parameters on the quality of the product obtained. The product obtained in Example 6 is most desirable.

TABLE 1

Properties/Characteristics of the prepared functionalized brine sludge material

| Sl No. | Techniques used | Properties/ Characteristics | Example 1 | Example 2 | Example 3 | Example 4 | Example 5 | Example 6 |
|---|---|---|---|---|---|---|---|---|
| 1 | Field Emission Scanning Electron Microscope (FESEM) | It provides the Topographical of the material i.e size of particles so synthesized. | Size of particles were Up to 20 nm | Size of particles were Up to 17 nm | Size of particles were Up to 16 nm | Size of particles were Up to 18 nm | Size of particles were Up to 20 nm | Size of particles were Up to 15 nm |
| 2 | Energy-dispersive X-ray spectroscopy (EDXA) | It identifies the elemental composition of material. | Confirms the presence of Ba, C, O, Na, Mg, Al, Si, S, Cl, Ca | Confirms the presence of Ba, C, O, Na, Mg, Al, Si, S, Cl, Ca | Confirms the presence of Ba, C, O, Na, Mg, Al, Si, S, Cl, Ca | Confirms the presence of Ba, C, O, Na, Mg, Al, Si, S, Cl, Ca | Confirms the presence of Ba, C, O, Na, Mg, Al, Si, S, Cl, Ca | Confirms the presence of Ba, C, O, Na, Mg, Al, Si, S, Cl, Ca |
| 3 | X-ray powder diffraction (XRD) | It is used for phase identification of a crystalline material and can provide information on unit cell dimensions. | Confirms the presence of crystalline nature and different phases like $BaSO_4$, NaCl, $Mg(OH)_2$, $SiO_2$ $CaCO_3$, $Al_2O_3$. | Confirms the presence of crystalline nature and different phases like $BaSO_4$, NaCl, $Mg(OH)_2$, $SiO_2$ $CaCO_3$, $Al_2O_3$. | Confirms the presence of crystalline nature and different phases like $BaSO_4$, NaCl, $Mg(OH)_2$, $SiO_2$ $CaCO_3$, $Al_2O_3$. | Confirms the presence of crystalline nature and different phases of element present. like $BaSO_4$, NaCl, $Mg(OH)_2$, $SiO_2$ $CaCO_3$, $Al_2O_3$. | Confirms the presence of crystalline nature and different phases of element present. like $BaSO_4$, NaCl, $Mg(OH)_2$, $SiO_2$ $CaCO_3$, $Al_2O_3$. | Confirms the presence of crystalline nature and different phases of element present. like $BaSO_4$, NaCl, $Mg(OH)_2$, $SiO_2$ $CaCO_3$, $Al_2O_3$. |

TABLE 1-continued

Properties/Characteristics of the prepared functionalized brine sludge material

| Sl No. | Techniques used | Properties/ Characteristics | Example 1 | Example 2 | Example 3 | Example 4 | Example 5 | Example 6 |
|---|---|---|---|---|---|---|---|---|
| 4 | Fourier Transform Infra Red Spectrometer (FTIR) | It identifies structures by giving information about functional groups present. | It confirms the presence of varying functional group like sulphate, carbonate, hydroxide etc. | It confirms the presence of varying functional group like sulphate, carbonate, hydroxide etc. | It confirms the presence of varying functional group like sulphate, carbonate, hydroxide etc. | It confirms the presence of varying functional group like sulphate, carbonate, hydroxide etc. | It confirms the presence of varying functional group like sulphate, carbonate, hydroxide etc. | It confirms the presence of varying functional group like sulphate, carbonate, hydroxide etc. |

ADVANTAGES

The process enables the conversion of toxic brine sludge into non-toxic form by forming chemical linkages of toxic elements with silicon and aluminum present in fly ash. Due to the use of microwave heating the number of steps in the process, temperature of synthesis and duration are minimized. It enables the conversion of chemical compounds present in brine sludge from micron size to nano size. It enables increased chemical homogeneity among the various constituents present in brine sludge waste and other reactants. The use of cetyl trimethyl ammonium bromide (CTAB) results in effective capping necessary for the synthesis of materials in nanosizes. The process saves the cost of costly chemicals such as barium sulphate, magnesium hydroxide and calcium carbonate as the chemicals inherently present in brine sludge are utilized for the reaction. It involves only two steps for the synthesis of functionalized brine sludge material.

We claim:
1. A functionalized brine sludge material comprising:
10 g to 50 g of brine sludge;
50 g to 100 g of fly ash;
6 g to 13 g of sodium hydroxide;
250 ml to 500 ml of ethylene glycol;
1 g to 10 g of cetyl trimethyl ammonium bromide; and
12 ml to 26 ml of water.

2. The material as claimed in claim 1, wherein the material is useful for the preparation of radiation shielding materials, geopolymeric materials, and chemically designed composite materials.

3. The material as claimed in claim 1, wherein the material comprises 45 g of brine sludge, 45 g of fly ash, 6 g of sodium hydroxide, 300 ml of ethylene glycol, 10 g of cetyl trimethyl ammonium bromide, and 12 ml of water.

4. A process for the preparation of the functionalized brine sludge material as claimed in claim 1, the process comprising:
(a) refluxing a homogenized mixture of brine sludge, fly ash, sodium hydroxide, ethylene glycol, cetyl trimethyl ammonium bromide, and water in a round bottom flask; and
(b) filtering the mixture as obtained in step (a) followed by drying in an air oven at a temperature of 100 to 110 degrees C. for a period of 1 to 2 hours, resulting in an in-situ synthesized functionalized brine sludge material.

5. The process as claimed in claim 4, wherein refluxing in step (a) is done at a temperature of 190 to 250 degrees C. for a duration of 2 to 6 hours using conventional heating.

6. The process as claimed in claim 4, wherein refluxing in step (a) is done at a temperature of 40 to 45 degrees C. for a duration of 15 to 20 minutes using microwave heating.

7. The process as claimed in claim 4, wherein drying in step (b) is done at a temperature of 110 degrees C. for a duration of 1 to 2 hours.

* * * * *